(12) United States Patent
Villeneuve et al.

(10) Patent No.: US 9,623,616 B2
(45) Date of Patent: Apr. 18, 2017

(54) MOLD FOR TIRE HAVING AN ANNULAR INSERT FOR MOLDING A TREAD PATTERN

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Bernard Villeneuve, Clermont-Ferrand (FR); Christian Gomet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/910,637

(22) PCT Filed: Jun. 26, 2014

(86) PCT No.: PCT/IB2014/001206
§ 371 (c)(1),
(2) Date: Feb. 5, 2016

(87) PCT Pub. No.: WO2015/019135
PCT Pub. Date: Feb. 12, 2015

(65) Prior Publication Data
US 2016/0193797 A1    Jul. 7, 2016

(30) Foreign Application Priority Data

Aug. 5, 2013  (FR) .................................... 13 01880

(51) Int. Cl.
B29D 30/06     (2006.01)
B29C 33/30     (2006.01)
(52) U.S. Cl.
CPC ..... B29D 30/0606 (2013.01); B29D 30/0629 (2013.01); B29C 33/306 (2013.01);
(Continued)
(58) Field of Classification Search
CPC  B29D 30/0606; B29D 30/0662; B29D 30/72; B29D 2030/0612;
(Continued)

(56) References Cited

U.S. PATENT DOCUMENTS 1,567,402 A  * 12/1925  Venn ..................... B29C 33/424
                                                              152/523
1,632,310 A    6/1927  Paynter
(Continued)

FOREIGN PATENT DOCUMENTS

DE          10357627 A1     7/2005
DE     102004052766 A1     5/2006
(Continued)

Primary Examiner — James Mackey
(74) Attorney, Agent, or Firm — Dickinson Wright PLLC

(57) ABSTRACT

A mold for vulcanizing and molding a tire, this tire including a tread delimited by two sidewalls, the mold including a ring for molding the patterns of the tread of the tire and two shells for molding the sidewalls, the mold including an annular groove extending in a recessed manner in one of the shells and an insert housed in the groove, this insert having tire-molding surface features, characterized in that the molding surface features of the insert include tire tread pattern elements extending in line with the patterns of the tread.

7 Claims, 3 Drawing Sheets

(52) U.S. Cl.
CPC ............... *B29D 2030/0612* (2013.01); *B29D 2030/0618* (2013.01); *B29K 2905/02* (2013.01)

(58) Field of Classification Search
CPC .... B29D 2030/0616; B29D 2030/0618; B29C 33/30; B29C 33/306; B29C 33/424
See application file for complete search history.

(56) References Cited

U.S. PATENT DOCUMENTS

| | | | | |
|---|---|---|---|---|
| 1,969,083 | A * | 8/1934 | Lawson | B29D 23/24 |
| | | | | 425/28.1 |
| 3,082,480 | A * | 3/1963 | Balle | B29D 30/0629 |
| | | | | 425/46 |
| 3,562,861 | A | 2/1971 | Youngblood | |
| 4,547,139 | A * | 10/1985 | Hershberger | B29D 30/0606 |
| | | | | 425/192 R |
| 5,190,767 | A * | 3/1993 | Beres | B29D 30/0629 |
| | | | | 425/28.1 |
| 5,643,519 | A | 7/1997 | Mauro et al. | |
| 5,939,002 | A * | 8/1999 | Heindel | B29D 30/0606 |
| | | | | 249/56 |
| 6,808,377 | B1 * | 10/2004 | Loney | B29D 30/0629 |
| | | | | 264/102 |
| 6,942,476 | B2 * | 9/2005 | Parmelee | B29C 33/32 |
| | | | | 249/103 |
| 6,955,782 | B1 | 10/2005 | Ratliff, Jr. | |
| 7,883,326 | B1 * | 2/2011 | Parmelee | B29D 30/0606 |
| | | | | 249/103 |
| 8,177,538 | B1 * | 5/2012 | Dempsey | B29C 33/42 |
| | | | | 425/195 |
| 8,512,020 | B2 * | 8/2013 | Lauwers | B29D 30/0629 |
| | | | | 264/219 |
| 2004/0032053 | A1 | 2/2004 | Parmelee et al. | |
| 2011/0318532 | A1 * | 12/2011 | Dusseaux | B29D 30/0629 |
| | | | | 428/141 |

FOREIGN PATENT DOCUMENTS

| | | |
|---|---|---|
| DE | 102007005455 A1 | 8/2008 |
| GB | 588170 A | 5/1947 |
| WO | 2004041499 A1 | 5/2004 |

* cited by examiner

MOLD FOR TIRE HAVING AN ANNULAR INSERT FOR MOLDING A TREAD PATTERN

This application is a 371 national phase entry of PCT/IB2014/001206, filed 26 Jun. 2014, which claims the benefit of French Patent Application No. 13/01880, filed 5 Aug. 2013, the contents of which are incorporated herein by reference for all purposes.

BACKGROUND

The present disclosure relates to molds for tires. More specifically, it relates to the molding of elements of various shapes on the sidewalls of these tires.

BACKGROUND

It is known that the sidewalls of tires have a large number of markings, such as the manufacturer's mark, the type of tire, the size of the tire, etc. These markings are obtained by providing means that are able to mold these markings, referred to below as "marking means", on the mold, and more particularly on side parts of this mold that are referred to as "shells". The shells are rotationally symmetrical parts, generally made of steel, and the patterns or markings to be reproduced on the tires are produced by machining, for example by etching or milling. When these parts are difficult to produce by conventional machining means such as by turning or milling, it is possible to obtain them by using aluminium parts obtained by casting. It is then possible to use a wide variety of patterns to be imprinted.

Tires in which the sidewalls are used for the application of tread pattern elements are also known. For example, document EP 1 560 688 describes a mold for a tire including a plurality of tread sectors for forming the tread, a mold back supporting the mold sectors, and molding shells for the lateral walls, the shells being produced from a single casting model. This mold is used to produce tires having tread pattern elements extending from the tread to the sidewalls. However, this type of design does not make it possible to produce certain types of complex tread pattern. Any change in the design of the tread patterns involves changing the entire mold, this involving high costs.

However, depending on the type of tire to be produced, it may be necessary to change the patterns initially provided.

Document U.S. Pat. No. 4,547,139 discloses the use of removable plates placed in a shell of a mold. These plates have marking means comprising indications which have to be changed regularly, for example the tire manufacturing period. However, because the plate has a relatively small size, the area of the elements it can contain is limited. It is thus not possible to incorporate a significant area of tread pattern elements into the sidewalk. Moreover, fixing the plate in the mold is complex.

Document JP61019314 discloses the use of a removable insert in the form of an annular one-piece part. More particularly, this annular insert is housed in a groove extending in a shell of the mold. This insert then has a relatively large diameter, this requiring great precision in its production in order that it satisfactorily fits in the groove, specifically around the entire circumference of this groove.

Document U.S. Pat. No. 1,632,310 discloses a mold for vulcanizing and molding a tire consisting of a plurality of interchangeable sections that make it possible to mold the sidewall or some other part of the tire. Each section contains molding cavities that form different letters or signs which, when the sections are arranged in a particular manner, make it possible to mold a succession of patterns that have a meaning and make it possible to identify the tires on which they are molded.

There is thus a need to provide a solution for replacing means for molding tread patterns that extend over the sidewalls of a tire which makes it possible to provide a sufficient molding area, while being easier and more practical to realize than in the related art.

SUMMARY

A first subject of an embodiment of the invention consists in providing a mold specifically designed for molding tires having tread pattern elements that extend over the sidewalk.

Another subject of an embodiment of the invention consists in providing a tire mold in which the sidewall patterns are produced with a very high level of precision.

To this end, an embodiment of the invention provides a mold for vulcanizing and molding a tire, this tire comprising a tread delimited by two sidewalls, the mold including a ring intended for molding the patterns of the tread of the tire and two shells, separate from the ring, for molding the sidewalls, the mold comprising an annular groove extending in a recessed manner in one of the shells and an insert housed in the groove, this insert having molding surface features of the insert, said molding surface features of the insert having tire tread pattern elements extending in line with the patterns of the tread.

According to one advantageous embodiment, the tire-molding surface features are positioned substantially at the junction between the shell and the ring of the mold.

According to another embodiment, the tire-molding surface features are situated at a position substantially radially inside the shell of the mold.

According to yet another embodiment, the tire-molding surface features are positioned substantially along the entire length of the shell of the mold.

Preferably, the insert is formed from a plurality of insert parts that are positioned one after another in the annular groove. This embodiment affords great flexibility. An embodiment of the invention thus proposes manufacturing an annular insert in a plurality of parts in order to make it easier to produce. Moreover, since each insert part has limited dimensions, it is easier to fit them into the groove in the shell. In addition, if modifications are made to the features of tread patterns on the sidewall of the tire, only those insert parts that comprise the regions affected by these modifications are replaced. It is thus not necessary to replace all of the insert. This aspect of the embodiment of the invention makes it possible for example to provide at least two insert parts having different dimensions.

Advantageously, each insert part has surfaces for contact with adjacent insert parts. Thus, at least two insert parts are connected together in a region of their contact surface, this connection being able to be broken in order to separate the two insert parts. By connecting all or some of the different insert parts together, it is possible to position all of the annular insert in the mold in one go.

During an operation of changing one of the insert parts, it is then sufficient to break the connections holding it to the other insert parts in order to extract it from the mold and replace it with another suitable insert part.

In an alternative embodiment, with the mold having an equatorial plane, an insert part is offset with respect to another, adjacent insert part in the direction of the equatorial plane of the mold. It is thus possible to provide a great variety of tread patterns.

In an advantageous alternative embodiment, each insert part has a molding surface able to be in contact with the tire, and at least two insert parts have different molding surface features.

According to one advantageous embodiment, at least one insert part is produced by laser sintering, said insert part having all or some of the tread pattern elements of the insert. The laser sintering method is a method which consists in constructing a part layer by layer by successively superposing layers of powder and selectively fusing this powder. This method may be computer-aided, making it possible to construct fairly complex parts. By using this sintering method for producing insert parts, it is possible to form complex arrangements of tread patterns on these insert parts, making it possible to improve the aesthetic and/or operational features of the tire.

In another embodiment, at least one insert part is produced from cast aluminium.

In an advantageous alternative embodiment, the shell comprises a through-opening extending between the insert and the outside of the shell.

In another embodiment, the shell comprises a through-opening, such as a bore, for example, extending between the insert and the outside of the shell. This type of arrangement makes it possible to introduce a means for removing the shell when the latter is force-fitted in the groove. In an alternative embodiment, a plurality of openings or bores are distributed around the circumference of the insert, for example one per insert part.

BRIEF DESCRIPTION OF THE DRAWINGS

Further features and advantages of the embodiments of the invention will become apparent from the following description, given by way of nonlimiting example, with reference to the attached drawings, in which.

Figure 1A:
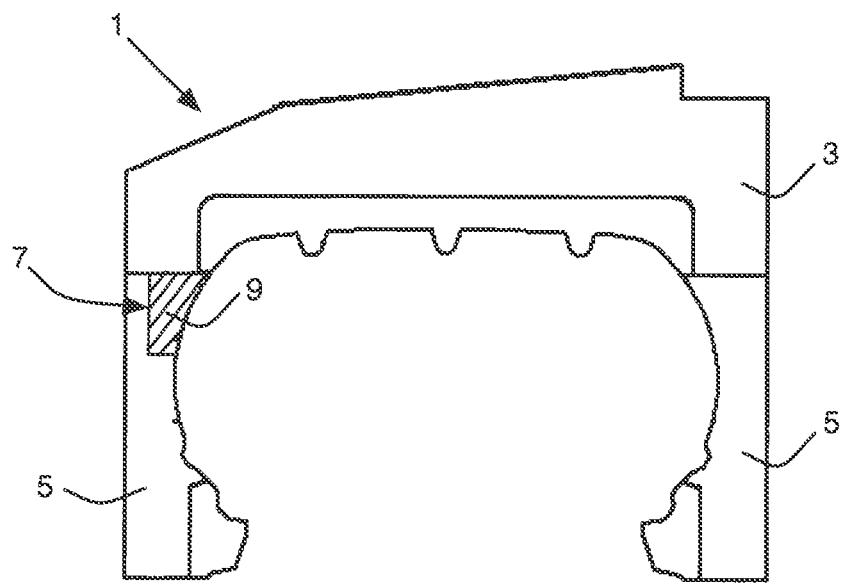
FIG. 1A schematically shows a view in cross section of a mold provided with an annular insert produced according to a first embodiment of the invention.

In the following description, elements which are substantially identical or similar will be denoted by identical references.

DETAILED DESCRIPTION OF SPECIFIC EMBODIMENTS

Definitions

A "tire" means all types of resilient tread whether or not it is subjected to an internal pressure.

The "tread" of a tire means a quantity of rubber compound delimited by lateral surfaces and by two main surfaces, one of which is intended to come into contact with a road surface when the tire is running.

The "sidewall" of a tire means a lateral surface of the tire, said surface being disposed between the tread of the tire and a bead of this tire.

A "tread pattern" means the volumetric and surface arrangements of rubber compounds at the external surface of the tire, said arrangements being intended to ensure contact with the roadway and having a shape for adapting the operational performance of the tire. The tread patterns also confer an aesthetic appearance on the tread or some other region of the tire, such as the sidewalls.

The "bead" of a tire means a part of the tire that is intended to be seated on a wheel rim.

A "mold" means a collection of separate molding elements which, when brought closer together, delimit a toroidal molding space for vulcanizing and molding a tire.

The "equatorial plane" means a plane perpendicular to an axis of revolution of the mold, separating this mold into two identical half-molds.

The "meridian plane" means a plane containing the axis of revolution of the mold.

As can be seen in FIG. 1, the mold 1 comprises a ring 3 intended for molding the tread of a tire and two shells 5 for molding the sidewalls. The mold 1 also comprises an annular groove 7 that extends around the circumference of the sidewall and is recessed into one of the shells 5. An insert 9 is mounted in a removable manner in the groove. The insert 9 has tire-molding surface features. These forming/molding elements are provided so as to position the tread patterns on the region of the sidewall of the tire to be molded, or to confer a particular aesthetic appearance, and/or to provide elements for protecting the sidewalls on the tire produced.

In an exemplary embodiment in FIG. 1A, the tire-molding surface features 11 are positioned substantially at the junction between the shell and the ring.

Figure 1B:
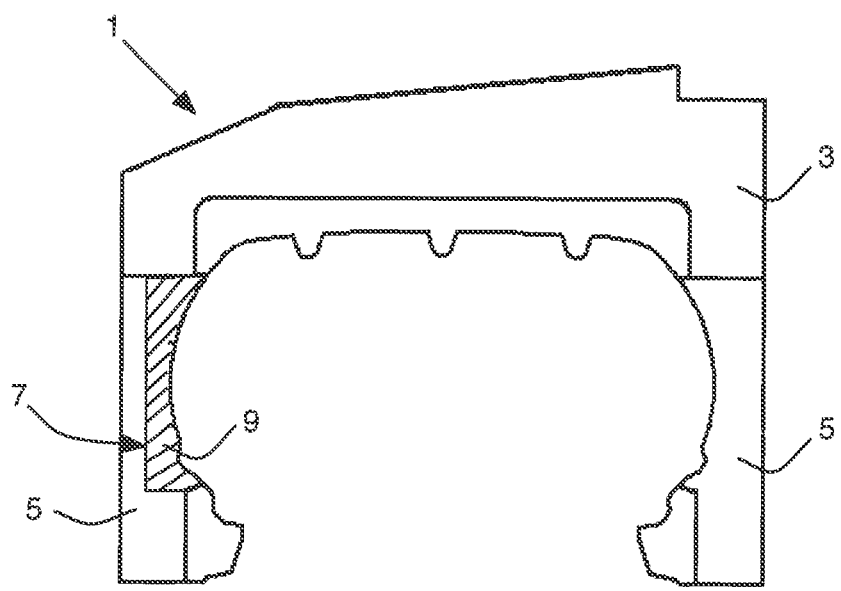
FIG. 1B schematically shows a view in cross section of a mold provided with an annular insert produced according to a second embodiment of the invention.

In an exemplary embodiment in FIG. 1B, the tire-molding surface features 11 are positioned substantially along the entire length of the shell.

Other, intermediate positions can also be provided. It is also possible to provide a plurality of inserts at one and the other of these positions.

Figure 2:
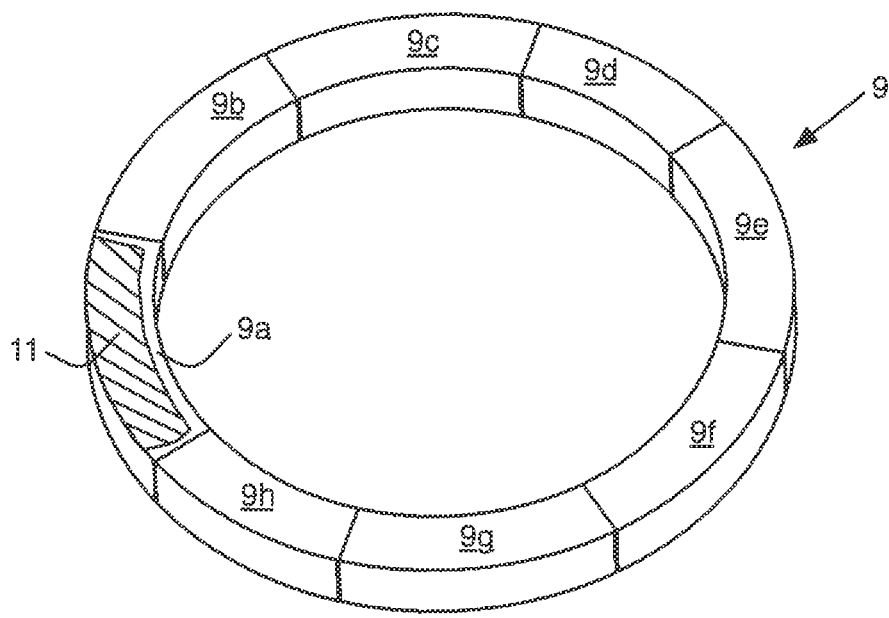
FIG. 2 schematically shows a perspective view of an example of an annular insert according to an embodiment of the invention.

As shown in an exemplary embodiment in FIG. 2, the insert may be formed from a plurality of insert parts 9a to 9h that are aligned angularly one after another so as to form an annulus with suitable dimensions for insertion in the annular groove 7.

Figure 3:
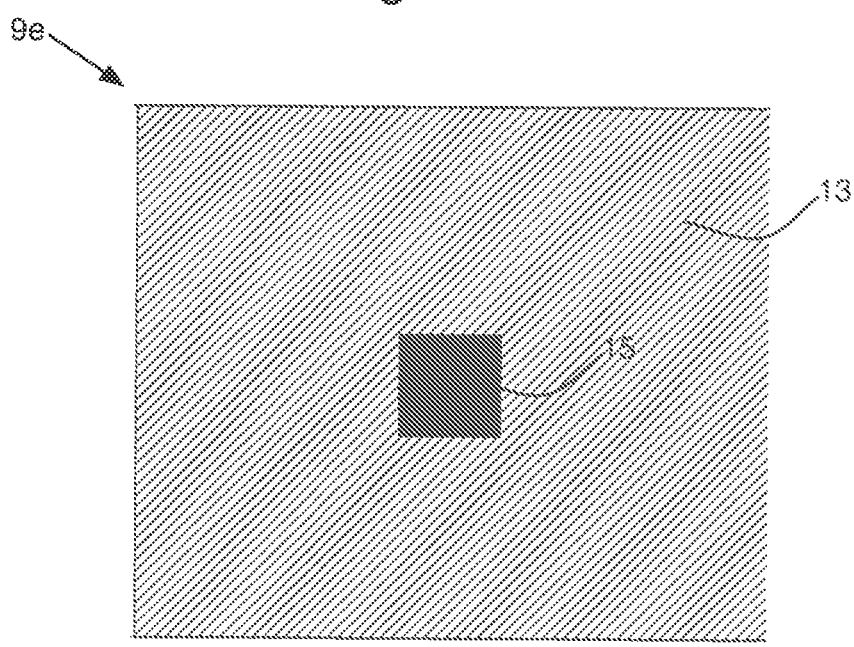
FIG. 3 schematically shows a face of an insert part from FIG. 2 connected to another insert part.

FIG. 3 shows an elevation view of a side face of the insert part 9e, as seen from the part 9f. The interface between the two sections produces a joining region with a contact surface 13.

A bridge 15, or joining element, makes it possible to fix two adjacent parts of the insert 9 together. In this example, the bridge 15 is provided in the central region of the contact surface 13. In alternative embodiments, a plurality of bridges can be provided. The profile and the surface of the bridges can vary depending on the embodiment. The bridges are advantageously provided during the manufacture of the insert, in particular when the insert is produced by laser sintering. In order to change an insert part, the bridge(s) connecting the parts in question is/are broken or cut. The section of the bridges is advantageously provided and dimensioned to make this operation easier. Specifically, even though the parts are separable by breaking the bridges when the insert is removed from the mold, mounting the insert in the mold, preferably with a tight fit, confers sufficient rigidity for the molding operations to be able to be carried out without risking breaking the bridges. Moreover, the insertion of the insert into the shell groove confers solid support for effectively withstanding the molding forces.

Figure 4:
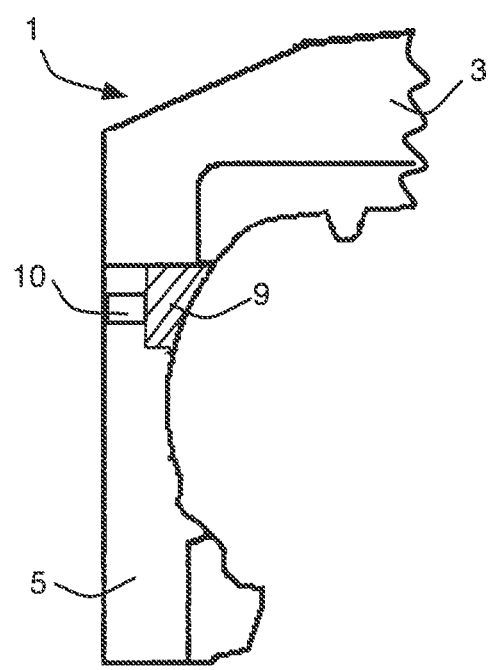
FIG. 4 schematically shows a view in cross section in a meridian plane of a part of a mold according to an embodiment of the invention, showing an opening that allows access to the insert from outside the mold.

In an alternative embodiment presented in FIG. 4, a through-orifice 10, such as a bore, provides communication between the outside of the mold and the inside of the mold. This orifice makes it possible to introduce a demolding tool from the outside of the mold in order to make it easier to extract the insert, either as a whole or for one or more insert parts. A plurality of orifices 10 can be distributed angularly around the circumference of the shell.

According to various alternative embodiments that are not illustrated, at least two insert parts have different dimensions, in terms of width and/or of height.

The verbs "comprise" and "have" do not exclude the presence of elements other than those listed in the claims. The word "a/an" preceding an element does not preclude the presence of a plurality of such elements.

The invention claimed is:

1. A mold for vulcanizing and molding a tire, the tire comprising
a tread delimited by two sidewalls, the mold including
a ring for molding the patterns of the tread of the tire and two shells, separate from the ring, for molding the sidewalls,
an annular groove extending in a recessed manner in one of the shells and
an insert housed in the groove, the insert having tire-molding surface features,
wherein the molding surface features of the insert include tire tread pattern elements extending in line with the patterns of the tread, and
the insert is formed from a plurality of insert parts that are positioned one after another in the annular groove,
each insert part has contact surfaces for contact with adjacent insert parts, and
at least two insert parts are connected together in a region of their contact surface, the connection being configured to be broken in order to separate the two insert parts.

2. The mold according to claim 1, wherein the tire-molding surface features are positioned substantially at a junction between the shell and the ring.

3. The mold according to claim 1, wherein the tire-molding surface features are positioned substantially along an entire length of the shell.

4. The mold according to claim 1, wherein
each insert part has a molding surface configured to be in contact with the tire, and
at least two insert parts have different molding surface features.

5. The mold according to claim 1, wherein at least one insert part is produced by laser sintering, the insert part having all or part of the molding surface features of the insert.

6. The mold according to claim 1, wherein at least one insert part is produced from cast aluminium.

7. The mold according to claim 1, wherein the shell comprises a through-opening extending between the insert and the outside of the shell.

* * * * *